Sept. 27, 1960 A. TAUPIN 2,954,261
CONVEYER SYSTEM
Filed April 20, 1959 2 Sheets-Sheet 1

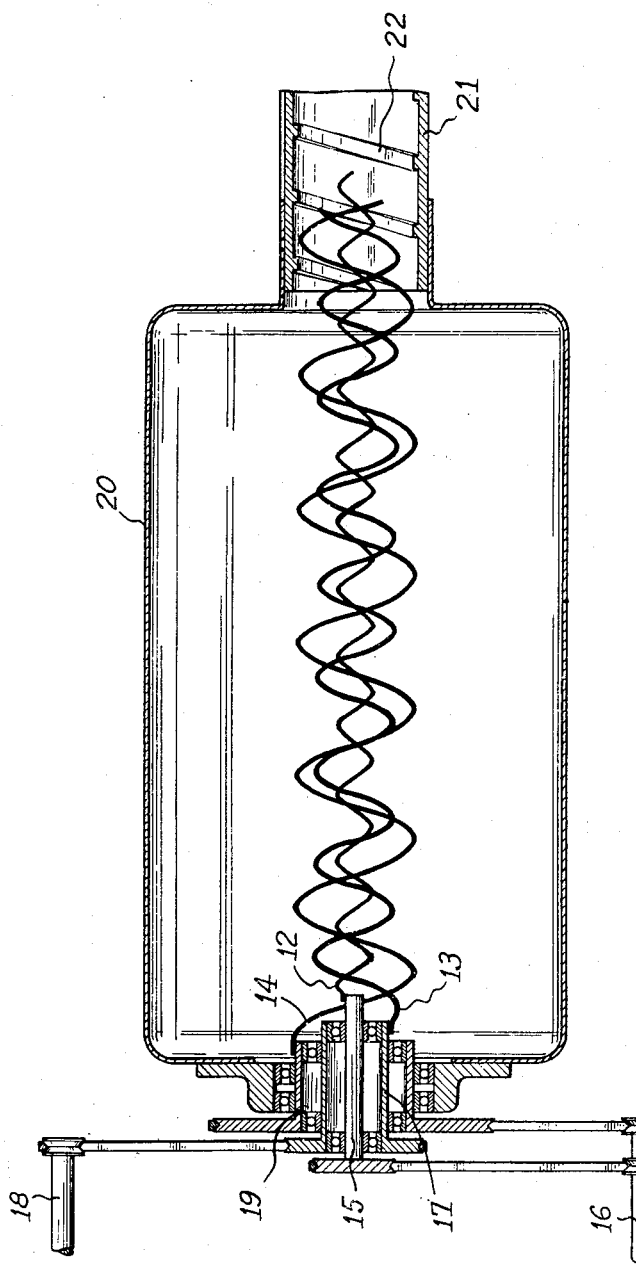

United States Patent Office 2,954,261
Patented Sept. 27, 1960

2,954,261

CONVEYER SYSTEM

André Taupin, Marseilles les Aubigny, France

Filed Apr. 20, 1959, Ser. No. 807,640

Claims priority, application France Apr. 26, 1958

14 Claims. (Cl. 302—50)

This invention relates to conveyer systems for transporting fluid or divided materials, and it is its general object to provide such a conveyer system which will operate on a new and improved principle.

Objects of this invention are to provide an improved conveyer system whereby materials in fluid or divided, e.g. pulverulent or granular, form, may be conveyed along a path of any desired configuration including portions having high upward grades and even vertical portions, and sections with small radii of curvature, in a more positive and reliable manner, and/or with expenditure of less motive power, than was possible with conveyers now available; and to provide such a conveyer that will be relatively simple and inexpensive to construct and maintain, convenient to install and operate, rugged and long-lived, and will impart minimum damage to the materials being conveyed.

In a basic aspect of the invention, I provide an improved conveyer system comprising a tube, at least one continuous wire-like element in the general form of a helix extending through the tube and rotatable about its axis, and means for rotating said element whereby to impart an axial component of displacement to fluid or divided material in the tube.

In a preferred aspect, I provide a conveyor system comprising a tube, at least two continuous wire-like elements in the general form of coaxially internested helices extending through the tube and individually rotatable about their axes, said elements having helical pitches alternately in one and in the reverse direction, and means for rotating all said elements in directions respectively corresponding with said pitches whereby all said elements will participate in imparting an axial component of displacement in a desired common direction to divided material along the tube.

In a tubular conveyor of the general type to which the invention relates it is obviously desirable that the particles of material will have imparted thereto axial velocity components of substantially the same magnitude regardless of the position of the particle in the cross section of the tubular casing. In accordance with a feature of this invention, I have found that this object is attainable by providing within the tubular casing a plurality of internested wire-like helices coaxial with one another and with the tubular casing, the helices having alternately reverse pitch directions when the helices are considered serially in a radial direction of the tublar casing, and imparting to all the helices reverse rotations at angular velocities so correlated with the pitch values of the respective helices that the product of angular velocity times pitch is substantially the same for each of the helices. It is the product just defined which will determine the axial velocity component imparted to the material.

The helices may comprise wires, e.g. steel wire, of circular or rectangular or other cross section, and they are simple to manufacture. Because of their light weight, they can readily be disposed in coaxially internested relation without requirng any intermediate supports other than occasional points or areas of contact between them and between the outermost helix and the casing wall; and such occasional points or areas of contact will only set up negligibly low friction forces. I have found that such a system will operate satisfactorily over considerable lengths, on the order of about 400 or more times the diameter of the outermost helix, i.e. about 20 meters length in the case of a conveyor tube having about 5 cm. internal diameter. Preferably each helix may have a pitch approximately equal to its diameter. The combined cross sectional area of the bundle of helices only represents a small fraction of the free cross sectional area available for the material being conveyed, yet it is found that the whole bundle contributes to imparting a positive, reliable, axial displacement to the material.

Each helix may comprise a set of lengths or sections coupled end to end by any suitable means such as interfitting joints. Desirably each such elementary helical length may taper somewhat in cross section from its upstream to its downstream end in terms of the direction in which drive torque is imparted to it.

The bundle of helices provides a plurality of narrow coaxial helicoidal driving surfaces, which all act simultaneously and synchronously on the particles of material to develop a resulting axial flux of motion throughout the entire inner volume of the tube.

To minimize friction between the outermost helix and the inner wall surface of the tubular casing, a stationary helix may be secured to or formed in relief on said inner wall surface, with the stationary helix having a reverse pitch with respect to the pitch of the outermost helix of the bundle.

In some cases it is found desirable to use helices in which successive turns may differ in diameter, e.g. may alternate between two unequal diameters. While a wire element thus shaped may not conform to the geometrical definition of a helix, it is to be expressly understood that the invention extends its scope to the use of such irregular helical elements, and the term helix will be used to designate them throughout the specification and claims in the interests of simpler disclosure.

Desirably, means are provided for inducing or facilitating an air flow through the conveyor tube in the direction of travel of the material, since such provision is found in many cases to enhance the operation of the system. Such means may comprise an axial air intake tube connected with the tubular casing at the material-inlet end of it, and a suction fan associated with the material-outlet end. In a preferred construction, the suction fan has its rotor secured to and driven by one of the helices, e.g. the innermost helix.

A conveyor system according to the invention may further include an input hopper or feeder and drive motor means for the helices positioned at the input end of the system; and material discharging means at the outlet end. Additionally, any desired cleaning equipment, including means for discharging blasts of air or jets of cleaning liquid through the conveyor tube may be provided in cases where a high degree of cleanliness is required, for example where the material being conveyed is flour or some other food product.

The above, and other objects, features and advantages of the invention, will be apparent in the following detailed description of illustrative embodiments which is to be read with reference to the accompanying drawings, wherein:

Fig. 3 is a larger scale sectional view of the input portion of a conveyor system according to a modified embodiment.

Figure 1:
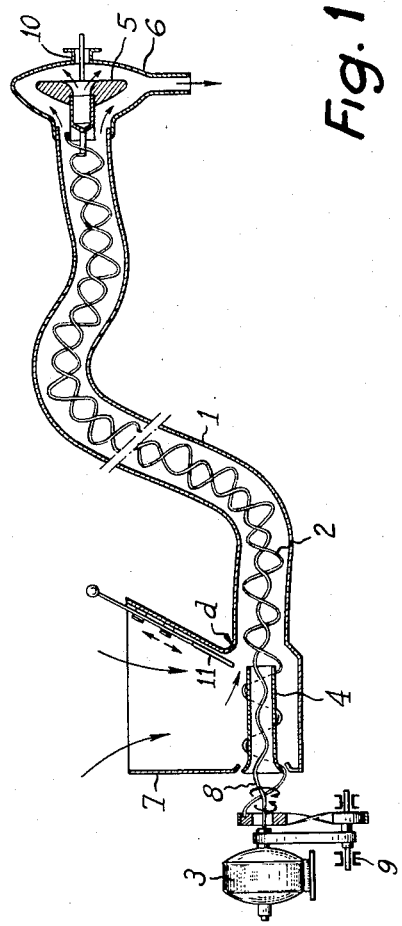
Fig. 1 is a highly schematic, simplified, view of a conveyor system according to the invention shown in vertical axial section.

The conveyor shown in Fig. 1 comprises a flexible tubular casing or conduit 1 which may be made of rubber or suitable plastic material. Extending within the tube is an outer helix 2 which comprises a suitably shaped steel wire, and is rapidly rotated about its axis from one end by means of an electric motor 3 by way of a mechanical transmission 9. There is also provided an inner helix 8 which is of opposite pitch to that of the helix 2, and is adapted to be driven from motor 3 in the direction opposed to the direction of rotation of the helix 2, for which purpose there may be provided a dual belt drive as shown at 9, one of the drive belts being crossed as illustrated to provide the desired opposed drive directions of the helices 2 and 8. At the intput end of the system a loading hopper 7 is provided, and the tubular conveyor conduit 1 connects with a side of the hopper at the base thereof as shown. An adjustable slidng valve 11 serves to control the effective passage area between the walls of the hopper and conduit casing at the connection d therebetween. An air intake tube 4 projects into the hopper in axial alignment with the outlet thereof into the conduit 1, and the initial turns of the outer helix 2 are secured around the periphery of the tube 4. The tube is mounted for rotation and is rotated together with the helix 2.

At the output end of the conveyor system the conduit 1 connects with an enlarged housing 6 which has a bottom outlet through which the conveyed material is discharged. The housing 6 contains a suction fan 5 which is secured on a shaft journalled at one end at 10 in a sealed bearing 10 of the housing. The fan 5 is secured to the adjacent end of the inner helix 8 so that it is rotatably driven thereby during operation of the system.

In operation, material in the hopper 7 is initially set into motion towards the hopper outlet by the initial turns of the outer helix 2 surrounding the revolving air intake tube 4, and enters the tubular casing 1. For relatively low mass rates of material flow, and relatively low upward grades of the conveyor, the outer helix 2 can be regarded as functioning in a manner similar to a conventional screw conveyor to propel the divided material along the tubular casing. The difference between the conveyor embodying the invention and a screw conveyor is, of course, that the helix 2 is in the form of a wire-like element rather than being a continuous surface. Hence, for higher rates of rotation and/or large upward slope angles, the divided material propelled by the helix 2 would tend to fall back and pack up in the central area of the conduit 1 radially inwards of the outer helix. Such material is then taken up by the inner helix 8 which in turn imparts to it a forward axial component due to its having both a reverse pitch from that of the outer helix 2 and to its being rotated in the opposite direction. Further, the inner helix is formed with a smaller pitch than that of the outer helix and is rotated at a higher angular rate than the outer helix, the arrangement being preferably such that the product of pitch and rotation rate is the same for each helix. As previously stated this feature ensures that both helices will impart equal axial components of motion to the particles of material so that the entire mass of material will tend to advance bodily throughout the cross section of the conduit. This advance is further aided, and undesirable packing of material in the axial area of the conduit is prevented, by the airflow which is set up through the conduit by cooperation of air intake tube 4 and suction fan 5.

Desirably the conveyor tube 1 may comprise a series of tubular sections of standard length connectable end to end according to requirement by any convenient means of connection. The end sections of the conveyor, respectively adapted for connection with an input hopper and with an output casing, as at 6, may also be of standard design. The wire helix elements 2 and 8 preferably also may comprise unitary lengths or elements interconnectable by suitable male-female joints, and preferably each wire helix element tapers somewhat from its upstream to its downstream end.

It is found that with an arrangement such as described, and especially with the provision for an airstream through the conduit, the conveyer system will operate satisfactorily even when there is a very great amount of clearance between the tubular casing wall and the outer helix, and between the outer and inner helices. Thus the total space taken up by the helices in the tube can be kept down to a very small fraction of the space available for passage of the material, so that a small number of helices can be used, efficiency is high, and damage to the materials conveyed by impact of the helix surfaces is practically negligible.

In the embodiment shown in Fig. 1, both helices 2 and 8 are shown as having equal pitch values, in opposite directions, the common pitch value being approximately equal to the inner tube diameter, and in such case the angular rates imparted to both helices would be equal and reverse, in accordance with the previously mentioned condition that pitch times rate should be the same for all the helices. However, it may be desirable to make the pitch values of the respective helices proportional, e.g. equal, to their respective outer diameters, and in such case the angular rates of rotation imparted to the helices would have correspondingly different values so as to maintain the equality between the products of pitch and rate.

Figure 2:
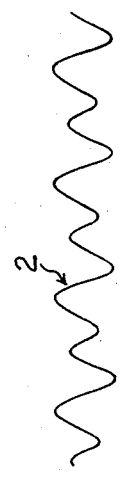
Fig. 2 illustrates a form of helix having unequal turns.

In some cases, especially in connection with the conveying of very low-density materials, it is advantageous to use helices, or one (e.g. the outer) helix, wherein the successive helical turns differ in diameter, and preferably alternate between two (or more) different diameters. An example of such a "helix" element is shown in Fig. 2, wherein turns are provided which alternately have a smaller and a larger diameter. It has been found that such an arrangement in effect increases the contacting surface area between the helical element and the material particles without having to increase the cross section of the wire used.

The volume flow of air required through the conduit tube is comparatively small, and no special measures are needed to allow for the discharge of such air at the output end of the system, beyond providing the enlargement represented by the casing 6, which may conveniently represent a twofold increase in cross sectional area over that of the conveyor tube. This affords a degree of expansion of the airflow which satisfactorily compensates for the decrease in airflow velocity.

In many cases, especially when conveying relatively hard materials not liable to pack, the fan 5 at the output end may be omitted, since the rotating helices actually develop a suction effect which may result in the desired airflow through the conveyer.

Fig. 3 illustrates a somewhat more elaborate embodiment of the invention. There are here provided within the tubular casing 21, three helix elements including the outermost helix 14, intermediate helix 13 and innermost helix 12. Helices 12 and 14 are pitched in one direction and rotated in one direction, while helix 13 is pitched in the reverse direction and rotated in the reverse direction from the other two. The three helices here differ in pitch value, the pitch for each helix being, e.g. substantially equal to its outer diameter. Thus, the pitch values of the three helices 14, 13, 12 in that order, may be respectively proportional to the numbers 6, 4 and 3. In accordance with the rule previously given, the angular velocities imparted to these three helices should then be respectively proportional to 3, 4, 5 and 6, in order that the product of pitch times angular rate shall be the same for each helix. Thus one suitable set of the angular velocities imparted to helices 14, 13 and 12 may be respectively 1,500 r.p.m., 2,250 r.p.m. and 3,000 r.p.m.

As shown in Fig. 3, the outermost helix 14 has its input end secured to the periphery of a sleeve 19 journalled in ball bearings in the wall of the fixed hopper 20 and having a large diameter drive pulley secured at the outer end of said sleeve. Intermediate helix 13 is secured to the periphery of a sleeve 17 journalled in bearings within the outer sleeve 19 and having an intermediate diameter pulley secured to its outer end; and innermost helix 12 is secured to a shaft 15 journalled in bearings within sleeve 17 and having a small-diameter pulley secured to the outer end of the shaft.

The small and large pulleys are both driven through drive belts from one motor shaft 16 rotated in one direction from a suitable motor, not shown, while the intermediate pulley is driven through a drive belt from another drive shaft 18 rotated in the opposite direction from the motor. Obviously any other drive means, including gearing, friction drives, etc., may be used to impart to the helices the respective rotational drives in the requisite directions and at the requisite velocities.

In order to minimize friction and mutual wear as between the outermost helix and the tubular conduit wall in a conveyor according to the invention, the tubular conduit wall is preferably provided with a helical spline of opposite pitch from that of the outermost helix, secured or formed therein. Such an arrangement is shown by way of example in Fig. 3, where the inner wall of conduit 21 is shown as being formed with a continuous helical spline 22.

I have found that my conveyor system is capable of negotiating sharp bends in its path, down to a radius of curvature as small as about five times the tube diameter. The flow rates obtainable with low power input are satisfactorily high. Thus in one working installation having a tube of 9 cm. inner diameter, used for conveying flour, delivery rates of 12 metric tons of flour per hour are consistently obtained. The power consumed is about 1½ horsepower. The installation is comparatively very lightweight, the overall weight of the system including motor, power drive, input hopper, and conveyor tube complete with its helices being only about 100 kilograms. The system does not require a high starting torque when starting under full load owing to the feature, characteristic of the invention, that the drive surface is divided into a plurality of low-area helical surfaces.

It will be understood that the embodiments described and shown are exemplary only.

What I claim is:

1. In a conveyer system for divided material, a flexible conduit, a pair of wirelike elements in the general form of coaxially internested helices of opposite pitch extending through the conduit, and means for imparting rotation to said elements in opposite senses to advance material along the conduit.

2. In a conveyer system for divided material, a tubular casing, a plurality of wirelike elements in the general form of coaxially internested helices extending through the casing, any two adjacent elements in the plurality having helical pitches reverse from each other, and means simultaneously imparting rotation to all said elements such that any two adjacent elements in the plurality are rotated in reverse directions thereby to advance material in a desired common direction along the casing.

3. In a conveyer system for divided material, a flexible conduit, a plurality of wirelike elements in the general form of coaxially internested helices extending through the conduit, the radius and pitch value of the helices decreasing in said plurality when considered along a radially inward direction of the conduit, the pitch of said helices being alternately in one and in the opposite sense, and means simultaneously imparting rotation to each of said elements in a direction corresponding to the pitch sense thereof and at a velocity such that the product of pitch times velocity remains substantially the same for all of said elements.

4. In a conveyer system for divided material a tubular casing, a plurality of wirelike elements in the general form of coaxially internested helices extending through the casing and having helical pitches alternately in one and the opposite direction, means for simultaneously rotating said elements in alternately reverse directions to advance said material in a desired axial direction along said casing, and means creating an airflow in said direction through the casing.

5. The system claimed in claim 4, wherein said airflow means comprise air inlet means connected axially with said casing at an input end of the conveyer system.

6. The system claimed in claim 4, wherein said airflow means comprise air inlet means axially of said casing at an input end of the system, and suction fan means positioned at the output end of the system.

7. The system claimed in claim 4, wherein said airflow means includes a suction fan rotor journalled coaxially with said casing at an output end thereof, and means connecting said rotor with the adjacent end of one of said elements for rotation thereby.

8. In the system claimed in claim 4, an enlarged housing connected with said tubular casing at an output end of the system, an outlet for material formed in said enlarged housing, and a suction fan rotor journalled in said housing coaxially with the tubular casing and connected to one of said helical elements for rotation thereby.

9. In the system claimed in claim 2, a loading hopper connected with said tubular casing at an input end of the conveyer system.

10. In the system claimed in claim 4, a loading hopper connected with said tubular casing at an input end of the system, an air intake pipe journalled in said hopper coaxially with the casing, and the outermost one of said elements having at least one end turn secured to the periphery of said pipe.

11. In the system claimed in claim 2, power means for imparting rotation to all said elements from the ends thereof adjacent the input end of said conveyer system.

12. The system claimed in claim 2, wherein at least one of said wirelike elements has alternate helical turns of unequal diameter.

13. The system claimed in claim 2, wherein the pitch of each element is substantially equal to the outer diameter thereof.

14. In the system claimed in claim 2, a helical surface formed in relief on the inner wall surface of said tubular casing and of a pitch which is in the opposite direction with respect to the pitch of the outermost one of said elements.

References Cited in the file of this patent

UNITED STATES PATENTS

| | | |
|---|---|---|
| 351,014 | Wissler | Oct. 19, 1886 |
| 1,702,554 | Walker | Feb. 19, 1929 |
| 2,182,680 | Rugg | Dec. 5, 1939 |
| 2,646,023 | Virgil | July 21, 1953 |
| 2,869,743 | Williams | Jan. 20, 1959 |